(12) United States Patent
Zhang et al.

(10) Patent No.: US 11,479,659 B2
(45) Date of Patent: Oct. 25, 2022

(54) OPAQUE HIGH-IMPACT METHYL METHACRYLATE-BUTADIENE-STYRENE POLYMER FOR IMPROVING IMPACT RESISTANCE OF POLYVINYL CHLORIDE AND PREPARATION METHOD THEREOF

(71) Applicant: SHANDONG DONGLIN NEW MATERIALS CO., LTD, Weifang (CN)

(72) Inventors: Xiaoquan Zhang, Weifang (CN); Tonggang Yi, Weifang (CN); Yongquan Xia, Weifang (CN); Honggang Zhao, Weifang (CN); Wen Liu, Weifang (CN); Boxiao Zou, Weifang (CN); Duo Xu, Weifang (CN); Xiaomin Ma, Weifang (CN)

(73) Assignee: SHANDONG DONGLIN NEW MATERIALS CO., LTD, Weifang (CN)

( * ) Notice: Subject to any disclaimer, the term of this patent is extended or adjusted under 35 U.S.C. 154(b) by 301 days.

(21) Appl. No.: 16/970,863

(22) PCT Filed: Dec. 13, 2019

(86) PCT No.: PCT/CN2019/125003
§ 371 (c)(1),
(2) Date: Aug. 18, 2020

(87) PCT Pub. No.: WO2020/164301
PCT Pub. Date: Aug. 20, 2020

(65) Prior Publication Data
US 2021/0221982 A1    Jul. 22, 2021

(30) Foreign Application Priority Data
Feb. 14, 2019    (CN) .......................... 201910113740.9

(51) Int. Cl.
| | |
|---|---|
| *C08L 9/06* | (2006.01) |
| *C08F 2/01* | (2006.01) |
| *C08F 2/24* | (2006.01) |
| *C08F 2/38* | (2006.01) |
| *C08F 212/08* | (2006.01) |
| *C08F 220/18* | (2006.01) |
| *C08F 279/06* | (2006.01) |
| *C08L 27/06* | (2006.01) |
| *C08L 51/04* | (2006.01) |
| *C08K 3/26* | (2006.01) |
| *C08K 3/32* | (2006.01) |

(52) U.S. Cl.
CPC ................... *C08L 9/06* (2013.01); *C08F 2/01* (2013.01); *C08F 2/24* (2013.01); *C08F 2/38* (2013.01); *C08F 212/08* (2013.01); *C08F 220/18* (2013.01); *C08F 279/06* (2013.01); *C08L 27/06* (2013.01); *C08L 51/04* (2013.01); *C08K 2003/262* (2013.01); *C08K 2003/324* (2013.01); *C08L 2207/53* (2013.01)

(58) Field of Classification Search
CPC ...... C08L 51/04; C08L 27/06; C08L 2207/53; C08F 279/06; C08F 220/14; C08F 212/08
See application file for complete search history.

(56) References Cited

U.S. PATENT DOCUMENTS

2017/0037235 A1* 2/2017 Lyons ..................... C08L 27/06

FOREIGN PATENT DOCUMENTS

| | | |
|---|---|---|
| CN | 1161345 A | 10/1997 |
| CN | 1247201 A | 3/2000 |
| CN | 101191002 A | 6/2008 |
| CN | 109929076 A | 6/2019 |
| EP | 0985692 A2 | 3/2000 |
| WO | WO 9619509 A2 | 6/1996 |
| WO | WO 2006134096 A1 | 12/2006 |

OTHER PUBLICATIONS

International Search Report issued in International Application No. PCT/CN2019/125003 dated Jan. 16, 2020 (5 pages).

* cited by examiner

*Primary Examiner* — Mark S Kaucher
(74) *Attorney, Agent, or Firm* — Bookoff McAndrews, PLLC

(57) ABSTRACT

An opaque high-impact methyl methacrylate-butadiene-styrene polymer (MBS) for improving impact resistance of polyvinyl chloride (PVC) including the following components by mass: 80-95% of core layer, 4-20% of shell layer and 0.001-0.05% of protective colloid, where the core layer is a butadiene (B) and styrene (S) polymer, the shell layer is one or a copolymer of two or three of S, acrylate and methyl methacrylate (MMA), and the protective colloid includes one or a compound of two or three of polyvinyl alcohol (PVA), gelatin and hydroxypropylmethyl cellulose (HPMC), may solve the problems of low impact resistance in the existing MBS product and difficult coagulation or spraying in the post-treatment process.

9 Claims, No Drawings

OPAQUE HIGH-IMPACT METHYL METHACRYLATE-BUTADIENE-STYRENE POLYMER FOR IMPROVING IMPACT RESISTANCE OF POLYVINYL CHLORIDE AND PREPARATION METHOD THEREOF

The present application is the U.S. national phase entry under 35 U.S.C. § 371 of International Application No. PCT/CN2019/125003, filed on Dec. 13, 2019, which claims priority to Chinese Patent Application No. 201910113740.9, filed on Feb. 14, 2019.

TECHNICAL FIELD

The present invention relates to the technical field of preparation of polyvinyl chloride (PVC) additives, and in particular, to an opaque high-impact methyl methacrylate-butadiene-styrene (MBS) polymer for improving impact resistance of PVC and a preparation method thereof.

BACKGROUND

At present, the methyl methacrylate-butadiene-styrene (MBS) polymer products on the market always have the disadvantage of low impact resistance. In order to improve the impact resistance, the content of butadiene (B) in the core layer, the proportion of the core layer in the core-shell ratio and the grafting rate of the shell layer need to be increased, and an appropriate latex particle size need to be designed. The four factors must be combined perfectly to realize ideal high impact resistance. The impact resistance largely depends on the B content. A higher B content produces higher impact resistance, and a lower B content leads to lower impact resistance.

There are two main reasons that the B content in existing products is low. First, the proportion of B in the rubber phase of the inner layer is low, generally below 90%. For example, the B content of the styrene-butadiene (SB) latex in the patent 200610070326.7 is 75% to 90%. Second, the rubber content of the inner layer in the whole resin is low, generally between 60% and 80% because if it exceeds 80%, there will be difficulties in coagulation or spraying. Therefore, the conventional production process usually uses two methods to ensure the impact resistance of the product. First, the B proportion in the rubber phase of the inner layer is reduced, generally below 90%, so as to reduce the proportion of the core layer in the overall resin content to below 90%. Second, the B proportion in the rubber phase of the inner layer is increased, generally 90% to 100%, so that the proportion of the core layer in the overall resin content is reduced to less than 85%, so as to avoid difficulties in coagulation or spraying during production. For example, the patent (application number: 99118619.2, publication number: CN1247201A) of Rohm and Haas Company in the United States describes the solution: In the inner layer, the core layer is a lightly cross-linked B and S polymer, where the B content is 65% to 85%, and the core layer accounts for 70% to 85%. The outer layer is one or a copolymer of two of S, acrylate and methyl methacrylate (MMA), accounting for 15% to 35%. This is for the purpose of avoiding difficulties in coagulation or spraying during production.

During MBS production, the appropriate latex particle size is achieved by means of continuous dropwise addition or multi-step polymerization. The continuous dropwise addition method is more dangerous, and a low grafting rate will cause difficulties in coagulation or spraying; the multi-step polymerization method will reduce production efficiency.

The present invention introduces a protective colloid, which is one or a compound of two or three of polyvinyl alcohol (PVA), gelatin and hydroxypropylmethyl cellulose (HPMC). In actual production, the protective colloid can better protect the grafting environment with less content and make the grafting more complete, so as to solve the problem of difficult coagulation or spraying in the post-treatment process.

SUMMARY

In order to solve the technical defects existing in the prior art, the present invention provides an opaque high-impact methyl methacrylate-butadiene-styrene (MBS) polymer for improving impact resistance of polyvinyl chloride (PVC) and a preparation method thereof. The present invention solves the problems of low impact resistance in the existing MBS product and difficult coagulation or spraying in the post-treatment process.

The present invention provides an opaque high-impact methyl methacrylate-butadiene-styrene (MBS) polymer for improving impact resistance of polyvinyl chloride (PVC), where the opaque high-impact MBS polymer for improving impact resistance of PVC includes the following components by mass:

80-95% of core layer;
4-20% of shell layer; and
0.001-0.05% of protective colloid;

the core layer is a lightly cross-linked butadiene (B) and styrene (S) polymer, where the B accounts for 95-100%, and the S accounts for 0-5%;

the shell layer is one or a copolymer of two or three of S, acrylate and methyl methacrylate (MMA), where the S accounts for 0-5%, the acrylate accounts for 0-2%, and the MMA accounts for 13-20%;

the protective colloid includes one or a compound of two or three of polyvinyl alcohol (PVA), gelatin and hydroxypropylmethyl cellulose (HPMC).

Preferably, the acrylate includes one or more of methyl acrylate, ethyl acrylate, butyl acrylate, isobutyl acrylate, tert-butyl acrylate and 2-ethylhexyl acrylate.

The present invention further provides a method for preparing the opaque high-impact MBS polymer for improving impact resistance of PVC of the foregoing technical solution, including the steps of:

(1) adding water, an emulsifier, a protective colloid, an alkali, an inorganic salt, a molecular weight regulator, a cross-linking agent and an initiator according to a formulated amount to a reactor; closing a lid of the reactor, and introducing a mixture of B and S or B into the reactor;

(2) heating the reactor to 65° C., and carrying out a reaction for 20 h; when the pressure in the reactor drops to 0.5 MPa, increasing the temperature to 75° C., and continuing the reaction for 4 h till the pressure is 0.1-0.2 MPa; after confirming the completion of the reaction, lowering the temperature to 65° C., and returning the reactor to normal pressure;

(3) adding an emulsifier, a protective colloid, and a mixture of outer monomer S, acrylate and MMA to the reactor, and continuing the reaction for 1-3 h till the reaction is completed; and (4) discharging a reaction product, and coagulating a latex by a coagulation method, centrifuging by a centrifuge, drying by a bubbling fluidized bed (BFB) or spray-drying by a high pressure pump, and then sieving and packing to obtain a finished product.

Preferably, the emulsifier is one or more of an alkyl sulfate, an alkyl phosphate, or an alkyl benzenesulfonate, a polyoxyethylene alkyl ether, a polyoxyethylene alkyl fatty acid ester, a long-chain alkyl saturated potassium soap and a long-chain alkyl unsaturated potassium soap.

Preferably, the alkali is sodium hydroxide or potassium hydroxide.

Preferably, the inorganic salt is sodium chloride, potassium chloride, sodium carbonate, sodium bicarbonate or trisodium phosphate.

Preferably, the molecular weight regulator is C4-C20 alkyl mercaptan.

Preferably, the cross-linking agent is one or more of divinylbenzene, divinyl ethylene glycol diacrylate, divinyl ethylene glycol dimethacrylate, diallyl phthalate, trivinyl ethylene glycol dimethacrylate, tetravinyl ethylene glycol dimethacrylate, diallyl maleate, allyl acrylate, and diallyl phthalate.

Preferably, the initiator is one of a persulfate, an organic peroxide and an azo compound, or is a redox initiation system including one of a persulfate, an organic peroxide and an azo compound and one of a sulfite, a bisulfite and a thiosulfate.

Compared with the prior art, the present invention has the following beneficial effects.

The opaque high-impact MBS polymer for improving impact resistance of PVC and preparation method thereof provided by the present invention introduce a protective colloid, which is one or a compound of two or three of polyvinyl alcohol (PVA), gelatin and hydroxypropylmethyl cellulose (HPMC). The protective colloid can better protect the grafting environment with less content to make the grafting more complete and improve the grating effect, so as to solve the problem of difficult coagulation or spraying in the post-treatment process.

The opaque high-impact MBS polymer for improving impact resistance of PVC obtained by the present invention solves the shortcoming that the impact resistance of the existing MBS product is greatly affected by the content of butadiene (B), greatly improves the impact resistance of the product, and enhances the practical performance of the product.

DETAILED DESCRIPTION

In order to further explain the beneficial effects of the present invention, a large number of tests have been performed. It should be noted that the tests of the present invention are intended to illustrate the beneficial technical effects of the present invention, and are not limited to the scope of the present invention.

Example 1

(1) Water, an emulsifier, a protective colloid, an alkali, an inorganic salt, a molecular weight regulator, a cross-linking agent and an initiator were added according to a formulated amount to a reactor. A lid of the reactor was closed, and pure butadiene (B) was introduced into the reactor.

(2) The reactor was heated to 65° C., and a reaction was carried out for about 20 h. When the pressure in the reactor dropped to 0.5 MPa, the temperature was increased to 75° C., and the reaction was continued for about 4 h till the pressure was 0.1-0.2 MPa. After confirming the completion of the reaction, the temperature was lowered to 65° C., and the reactor was returned to normal pressure, where an inner layer accounted for 80%.

(3) An emulsifier, a protective colloid (0.01% by weight of monomer), and a mixture of outer monomer styrene (S, 4.0%), acrylate (2.0%) and methyl methacrylate (MMA, 14%) were added to the reactor, and the reaction was continued for 1-3 h till the reaction was completed, where an outer layer accounted for 20%.

(4) A reaction product was discharged, and a latex was coagulated by a coagulation method, centrifuged by a centrifuge, dried by a bubbling fluidized bed (BFB) or spray-dried by a high pressure pump, and then sieved and packed to obtain a finished product.

Example 2

The pure B in step (1) in Example 1 was changed to B and S (97:3), and the remaining conditions were the same as in Example 1.

Example 3

The pure B in step (1) in Example 1 was changed to B and S (95:5), and the remaining conditions were the same as in Example 1.

Example 4

The proportion of the inner layer, 80% in step (2) in Example 1 was changed to 85%, and the proportion of the outer layer, 20% in step (3) was changed to 15%, and the rest were the same as in Example 1.

Example 5

The pure B in step (1) in Example 1 was changed to B and S (97:3); the proportion of the inner layer, 80% in step (2) was changed to 85%, and the proportion of the outer layer, 20% in step (3) was changed to 15%; the rest were the same as in Example 1.

Example 6

The pure B in step (1) in Example 1 was changed to B and S (95:5); the proportion of the inner layer, 80% in step (2) was changed to 85%, and the proportion of the outer layer, 20% in step (3) was changed to 15%; the rest were the same as in Example 1.

Example 7

The proportion of the inner layer, 80% in step (2) in Example 1 was changed to 90%, and the proportion of the outer layer, 20% in step (3) was changed to 10%, and the rest were the same as in Example 1.

Example 8

The pure B in step (1) in Example 1 was changed to B and S (97:3); the proportion of the inner layer, 80% in step (2) in Example 1 was changed to 90%, and the proportion of the outer layer, 20% in step (3) was changed to 10%; the rest were the same as in Example 1.

Example 9

The pure B in step (1) in Example 1 was changed to B and S (95:5); the proportion of the inner layer, 80% in step (2)

in Example 1 was changed to 90%, and the proportion of the outer layer, 20% in step (3) was changed to 10%; the rest were the same as in Example 1.

Example 10

The proportion of the inner layer, 80% in step (2) in Example 1 was changed to 95%, and the proportion of the outer layer, 20% in step (3) was changed to 15%, and the rest were the same as in Example 1.

Example 11

The pure B in step (1) in Example 1 was changed to B and S (97:3); the proportion of the inner layer, 80% in step (2) in Example 1 was changed to 95%, and the proportion of the outer layer, 20% in step (3) was changed to 15%; the rest were the same as in Example 1.

Example 12

The pure B in step (1) in Example 1 was changed to B and S (95:5); the proportion of the inner layer, 80% in step (2) in Example 1 was changed to 95%, and the proportion of the outer layer, 20% in step (3) was changed to 15%; the rest were the same as in Example 1.

Example 13

The outer monomer in step (3) in Example 1 was changed to a mixture of S (1.0%), acrylate (0.5%) and MMA (18.5%), and the rest were the same as in Example 1.

Example 14

The outer monomer in step (3) in Example 2 was changed to a mixture of S (1.0%), acrylate (0.5%) and MMA (18.5%), and the rest were the same as in Example 2.

Example 15

The outer monomer in step (3) in Example 3 was changed to a mixture of S (1.0%), acrylate (0.5%) and MMA (18.5%), and the rest were the same as in Example 3.

Example 16

The outer monomer in step (3) in Example 4 was changed to a mixture of S (1.0%), acrylate (0.5%) and MMA (18.5%), and the rest were the same as in Example 4.

Example 17

The outer monomer in step (3) in Example 5 was changed to a mixture of S (1.0%), acrylate (0.5%) and MMA (18.5%), and the rest were the same as in Example 5.

Example 18

The outer monomer in step (3) in Example 6 was changed to a mixture of S (1.0%), acrylate (0.5%) and MMA (18.5%), and the rest were the same as in Example 6.

Example 19

The outer monomer in step (3) in Example 7 was changed to a mixture of S (1.0%), acrylate (0.5%) and MMA (18.5%), and the rest were the same as in Example 7.

Example 20

The outer monomer in step (3) in Example 8 was changed to a mixture of S (1.0%), acrylate (0.5%) and MMA (18.5%), and the rest were the same as in Example 8.

Example 21

The outer monomer in step (3) in Example 9 was changed to a mixture of S (1.0%), acrylate (0.5%) and MMA (18.5%), and the rest were the same as in Example 9.

Example 22

The outer monomer in step (3) in Example 10 was changed to a mixture of S (1.0%), acrylate (0.5%) and MMA (18.5%), and the rest were the same as in Example 10.

Example 23

The outer monomer in step (3) in Example 11 was changed to a mixture of S (1.0%), acrylate (0.5%) and MMA (18.5%), and the rest were the same as in Example 11.

Example 24

The outer monomer in step (3) in Example 12 was changed to a mixture of S (1.0%), acrylate (0.5%) and MMA (18.5%), and the rest were the same as in Example 12.

Comparative Example 1

The protective colloids in steps (1) and (3) in Example 1 were removed, and the rest were the same as in Example 1.

Comparative Example 2

The protective colloids in steps (1) and (3) in Example 4 were removed, and the rest were the same as in Example 4.

Comparative Example 3

The protective colloids in steps (1) and (3) in Example 7 were removed, and the rest were the same as in Example 7.

Comparative Example 4

The protective colloids in steps (1) and (3) in Example 10 were removed, and the rest were the same as in Example 10.

Table 1 provides a result of performance comparison of the opaque high-impact MBS polymers for improving impact resistance of PVC obtained in the examples and the products obtained in the comparative examples of the present invention.

TABLE 1

Performance of products obtained in examples and comparative examples of the present invention

| | SN | Latex particle size | Grafting rate (%) | Flocculation temperature (° C.) | Particle size after flocculation | Dry powder failing to pass 20-mesh sieve (%) | Impact resistance |
|---|---|---|---|---|---|---|---|
| Examples | Example 1 | Moderate | 99.8 | 70 | Fine | 1.2 | 15.6 |
| | Example 2 | Moderate | 99.5 | 70 | Fine | 1.1 | 15.9 |
| | Example 3 | Moderate | 99.4 | 70 | Fine | 0.8 | 16.4 |
| | Example 4 | Moderate | 99.8 | 65 | Fine | 1.3 | 16.2 |
| | Example 5 | Moderate | 99.7 | 65 | Fine | 2.5 | 17.1 |
| | Example 6 | Moderate | 99.6 | 65 | Fine | 1.0 | 16.8 |
| | Example 7 | Moderate | 99.5 | 50 | Fine | 2.2 | 16.9 |
| | Example 8 | Moderate | 99.7 | 50 | Fine | 1.0 | 17.5 |
| | Example 9 | Moderate | 99.5 | 50 | Fine | 0.9 | 17.6 |
| | Example 10 | Moderate | 99.3 | 30 | Moderate | 13.5 | 17.2 |
| | Example 11 | Moderate | 99.1 | 30 | Moderate | 14.7 | 17.1 |
| | Example 12 | Moderate | 99.5 | 30 | Moderate | 13.3 | 17.5 |
| | Example 13 | Moderate | 99.8 | 70 | Fine | 0.9 | 15.5 |
| | Example 14 | Moderate | 99.5 | 70 | Fine | 0.8 | 15.7 |
| | Example 15 | Moderate | 99.5 | 70 | Fine | 1.1 | 15.9 |
| | Example 16 | Moderate | 99.7 | 65 | Fine | 1.5 | 16.1 |
| | Example 17 | Moderate | 99.5 | 65 | Fine | 1.6 | 16.5 |
| | Example 18 | Moderate | 99.1 | 65 | Fine | 1.0 | 16.3 |
| | Example 19 | Moderate | 99.3 | 50 | Fine | 2.2 | 16.9 |
| | Example 20 | Moderate | 99.7 | 50 | Fine | 1.5 | 17.2 |
| | Example 21 | Moderate | 99.5 | 50 | Fine | 3.2 | 17.4 |
| | Example 22 | Moderate | 99.8 | 30 | Moderate | 10.5 | 17.2 |
| | Example 23 | Moderate | 99.8 | 30 | Moderate | 13.5 | 17.5 |
| | Example 24 | Moderate | 99.9 | 30 | Moderate | 12.1 | 17.0 |
| Comparative Examples | Comparative Example 1 | Small | 95.6 | 30 | Large | 38.2 | 13.2 |
| | Comparative Example 2 | Small | 94.3 | 30 | Large | 55.3 | 14.2 |
| | Comparative Example 3 | Small | 95.1 | 20 | Small agglomerate | 82.9 | 14.6 |
| | Comparative Example 4 | Small | 92.9 | 20 | Large agglomerate | 100 | 13.9 |

Remarks:

1. In the comparative examples, because the particle size was relatively large and it was not easy to disperse, the product was crushed and passed through a 20-mesh sieve before testing.

2. The formula used to improve the impact resistance in the table included 100 parts of PVC, 1.2 parts of organotin, 12 parts of light calcium carbonate, 0.6 parts of DL-74 (polyethylene wax), 0.6 parts of paraffin, 0.9 parts of calcium stearate, 10 parts of titanium dioxide and 8 parts of MBS.

The above description of the examples is intended to help understand the method and core idea of the present invention. It should be noted that, several improvements and modifications may be made by persons of ordinary skill in the art without departing from the principle of the present invention, and these improvements and modifications should also be considered within the protection scope of the present invention. Various modifications to these examples are readily apparent to persons skilled in the art, and the generic principles defined herein may be practiced in other examples without departing from the spirit or scope of the invention. Thus, the present invention is not limited to the examples shown herein but falls within the widest scope consistent with the principles and novel features disclosed herein.

What is claimed is:

1. An opaque high-impact methyl methacrylate-butadiene-styrene (MBS) polymer for improving impact resistance of polyvinyl chloride (PVC), wherein the opaque high-impact MBS polymer for improving impact resistance of PVC comprises the following components by mass:

80-95% of core layer;
4-20% of shell layer; and
0.001-0.05% of protective colloid;
the core layer is a lightly cross-linked butadiene (B) and styrene (S) polymer, wherein the B accounts for 95-100%, and the S accounts for 0-5%;
the shell layer is one or a copolymer of two or three of S, acrylate and methyl methacrylate (MMA), wherein the S accounts for 0-5%, the acrylate accounts for 0-2%, and the MMA accounts for 13-20%;
the protective colloid comprises one or a compound of two or three of polyvinyl alcohol (PVA), gelatin and hydroxypropylmethyl cellulose (HPMC).

2. The opaque high-impact MBS polymer for improving impact resistance of PVC according to claim 1, wherein the acrylate comprises one or more of methyl acrylate, ethyl acrylate, butyl acrylate, isobutyl acrylate, tert-butyl acrylate and 2-ethylhexyl acrylate.

3. A method for preparing the opaque high-impact MBS polymer for improving impact resistance of PVC according to claim 1, comprising the steps of:

(1) adding water, an emulsifier, a protective colloid, an alkali, an inorganic salt, a molecular weight regulator, a cross-linking agent and an initiator according to a formulated amount to a reactor; closing a lid of the reactor, and introducing a mixture of B and S or B into the reactor;

(2) heating the reactor to 65° C., and carrying out a reaction for 20 h; when the pressure in the reactor drops to 0.5 MPa, increasing the temperature to 75° C., and continuing the reaction for 4 h till the pressure is 0.1-0.2 MPa; after confirming the completion of the reaction, lowering the temperature to 65° C., and returning the reactor to normal pressure;

(3) adding an emulsifier, a protective colloid, and a mixture of outer monomer S, acrylate and MMA to the reactor, and continuing the reaction for 1-3 h till the reaction is completed; and (4) discharging a reaction product, and coagulating a latex by a coagulation method, centrifuging by a centrifuge, drying by a bubbling fluidized bed (BFB) or spray-drying by a high pressure pump, and then sieving and packing to obtain a finished product.

4. The method for preparing the opaque high-impact MBS polymer for improving impact resistance of PVC according to claim 3, wherein the emulsifier is one or more of an alkyl sulfate, an alkyl phosphate, or an alkyl benzenesulfonate, a polyoxyethylene alkyl ether, a polyoxyethylene alkyl fatty acid ester, a long-chain alkyl saturated potassium soap and a long-chain alkyl unsaturated potassium soap.

5. The method for preparing the opaque high-impact MBS polymer for improving impact resistance of PVC according to claim 4, wherein the alkali is sodium hydroxide or potassium hydroxide.

6. The method for preparing the opaque high-impact MBS polymer for improving impact resistance of PVC according to claim 5, wherein the inorganic salt is sodium chloride, potassium chloride, sodium carbonate, sodium bicarbonate or trisodium phosphate.

7. The method for preparing the opaque high-impact MBS polymer for improving impact resistance of PVC according to claim 6, wherein the molecular weight regulator is C4-C20 alkyl mercaptan.

8. The method for preparing the opaque high-impact MBS polymer for improving impact resistance of PVC according to claim 7, wherein the cross-linking agent is one or more of divinylbenzene, divinyl ethylene glycol diacrylate, divinyl ethylene glycol dimethacrylate, diallyl phthalate, trivinyl ethylene glycol dimethacrylate, tetravinyl ethylene glycol dimethacrylate, diallyl maleate, allyl acrylate, and diallyl phthalate.

9. The method for preparing the opaque high-impact MBS polymer for improving impact resistance of PVC according to claim 8, wherein the initiator is one of a persulfate, an organic peroxide and an azo compound, or is a redox initiation system comprising one of a persulfate, an organic peroxide and an azo compound and one of a sulfite, a bisulfite and a thiosulfate.

* * * * *